US005207629A

United States Patent [19]

Walsh

[11] Patent Number: 5,207,629

[45] Date of Patent: May 4, 1993

[54] APPARATUS FOR ATTACHING INSERT PANELS TO CARTON BLANKS

[75] Inventor: Joseph C. Walsh, Longmont, Colo.

[73] Assignee: Graphic Packaging Corporation, Paoli, Pa.

[21] Appl. No.: 785,410

[22] Filed: Oct. 31, 1991

Related U.S. Application Data

[63] Continuation-in-part of Ser. No. 579,854, Sep. 7, 1990, Pat. No. 5,108,355.

[51] Int. Cl.[5] .......................... B32B 1/04; B32B 7/02; B32B 17/54; B32B 17/04

[52] U.S. Cl. .......................................... 493/29; 493/89; 493/419; 493/453; 493/461; 198/403; 271/186

[58] Field of Search ....................... 493/10, 29, 84, 89, 493/94, 95, 110, 379, 390, 416, 419, 420, 446, 447, 453, 460, 461; 198/403; 271/186

[56] References Cited

U.S. PATENT DOCUMENTS

| | | | |
|---|---|---|---|
| 3,547,013 | 12/1970 | Gentry et al. | 493/379 |
| 3,917,257 | 11/1975 | Caldwell | 198/403 |
| 4,078,789 | 3/1978 | Kittredge et al. | 271/186 |
| 4,346,880 | 8/1982 | Roller et al. | 271/186 |
| 4,518,380 | 5/1985 | Shimizu et al. | 493/420 |
| 5,048,814 | 9/1991 | Svyatsky | 271/186 |

FOREIGN PATENT DOCUMENTS

| | | | |
|---|---|---|---|
| 1390293 | 1/1965 | France | 493/419 |

*Primary Examiner*—William E. Terrell
*Attorney, Agent, or Firm*—Klaas, Law, O'Meara & Malkin

[57] ABSTRACT

An apparatus for simultaneously inverting a carton blank and folding end flaps thereon includes a system of endless belts, nip rollers, and inversion guides. A blank passes between a first nip assembly and the belts to be fed upwardly between a pair of guides, and withdrawn downwardly and fed out again inverted second nip assembly cooperating with the belts. Flap folders fold flaps on the blank during the operation.

17 Claims, 9 Drawing Sheets

APPARATUS FOR ATTACHING INSERT PANELS TO CARTON BLANKS

The present application is a continuation-in-part of copending U.S. patent application Ser. No. 579,854 filed Sep. 7, 1990, U.S. Pat. No. 5,108,355 for METHOD AND APPARATUS FOR AT INSERT PANELS TO CARTON BLANKS of Joseph Christopher Walsh, which is hereby specifically incorporated by reference for all that it discloses.

BACKGROUND OF THE INVENTION

The present invention relates to carton forming methods and apparatus and, more particularly, to a method and apparatus for attaching carton reinforcing insert panels to carton blanks prior to folding and gluing of the blanks and panels to provide reinforced cartons.

Most modern container cartons are formed from unitary carton blanks which are folded along precut score lines and glued together in a high speed operation (e.g. 800 cartons per minute) by an apparatus known in the packaging industry as a folder/gluer machine.

Recently, certain container cartons, which are adapted to hold relatively high density material such as concentrated laundry detergent, have been reinforced with an insert panel which is attached to the primary carton blank. The primary carton blank and the attached insert panel are folded and glued in a traditional manner by a conventional folder/gluer machine to provide a container carton. In such a reinforced carton forming operation, each insert panel must be properly aligned with and affixed to a associated primary carton blank before the traditional folding and gluing operation begins.

One prior art device which performs the functions of alignment and attachment of insert panels is manufactured and sold by Jagenberg, Inc. of Freshwater Blvd., P.O. Box 188 Enfield, Conn., 06082 under the product designation "Inlet Spotter". A problem with such apparatus has been that they operate relatively slowly as compared to the traditional folder/gluer machines into which the carton blanks and attached insert panels are subsequently fed. As a result the cost for forming insert panel reinforced cartons is significantly higher than the cost for forming unitary blank cartons.

OBJECTS OF THE INVENTION

It is an object of the present invention to provide a method and apparatus for aligning and attaching insert panels to carton blanks which is substantially faster and more cost effective than prior art machines which perform this function.

It is another object of the present invention to provide a method and apparatus for aligning and attaching insert panels to carton blanks in which an edge portion of an insert panel is urged into positive engagement with an associated folded surface of a container carton blank in order to enable registration to be achieved in a relatively high speed operation.

SUMMARY OF THE INVENTION

The present invention is directed to a method and apparatus for attaching insert panels to carton blanks in a predetermined alignment configuration which enables the carton blanks and attached insert panels to be fed directly into a conventional folder/gluer machine in a continuous, high speed operation.

Thus, the invention may comprise an apparatus for operating on a carton blank of the type having a first face surface, a second face surface opposite said first face surface, a first end portion terminating in a first edge surface, and a second end portion opposite said first end portion and terminating in a second edge surface comprising: flipping path means for reorienting said carton blank during displacement therealong comprising a first path portion having a first end and a second end, a second path portion extending generally transversely of said first path portion and having a first end and a second end, a first transition portion connecting said second end of said first path portion to said first end of said second path portion, a third path portion extending generally parallel to said first path portion and having a first end proximal said first path portion and a second end distal said first path portion, and a second transition portion connecting said first end of said second path portion to said first end of said third path portion; a first nip means for initially nippingly engaging said carton blank at said first end portion thereof and for continuously nippingly moving said carton blank along said first path portion in a direction from said first end toward said second end thereof with said first face surface of said carton blank facing upwardly and thereafter along said second path portion in a direction from said first end toward said second end thereof; second nip means positioned adjacent said first nip means for initially nippingly engaging said carton blank at said second end portion thereof after s id carton blank is disengaged by said first nip means and for continuously moving said carton blank along said second displacement path in a direction from said second end towards s id first end thereof and thereafter along said third path portion in a direction from said first end towards said second end thereof with said first face surface of said carton blank facing downwardly.

The invention may also comprise an apparatus for operating on a carton blank of the type having a first surface adapted to form an exterior portion of a subsequently formed carton, a second surface adapted to form an interior surface of a subsequently formed carton, a front edge, a back edge, and a pair of opposite lateral side edges, said front flap portion defining a portion of said front edge and being foldable along a fold line extending generally parallel to said front edge, comprising: infeed means for feeding said carton blank into a first nip means in a generally horizontally disposed orientation with said first surface facing upwardly and said front edge leading; first nip means for nippingly engaging portions of said carton blank which are not aligned with said front flap portion for urging said carton blank along a path including a forwardly extending, horizontal, first path portion, a generally vertical second path portion and an arcuate transition portion connecting said first path portion with a lower end of said second path portion; flap folding means positioned along said path for engaging and folding said front flap toward said second surface of said carton blank as said carton blank traverses said first and second path portions; stop means for positively engaging said carton blank and stopping upward displacement thereof along said second path portion after said carton blank leaves said first nip means; first biasing means for urging said rear edge portion of said carton blank means generally horizontally toward a second nip after it is disengaged from said first nip; second biasing means for urging said carton blank generally vertically downwardly toward said second nip after it is disengaged from said first nip; said second nip means being for nippingly engaging said carton blank for urging said carton blank downwardly along said second path portion and forwardly along a generally horizontal third path portion and along a transition path connecting said lower end of said second path portion with said third path portion, said second nip means moving said carton blank along said third path portion in an orientation with said front edge trailing and said second surface up; and flap holding means for engaging said front flap after it is folded for maintaining it in a folded orientation as it moves along said path.

The invention may also comprise an apparatus for operating on a carton blank of the type having a first face surface, a second face surface opposite said first face surface, a first end portion terminating in a first edge surface, and a second end portion opposite said first end portion and terminating in a second edge surface comprising: an endless belt means for forming portions of a first conveying nip and a second conveying nip and having a first generally horizontally extending portion moving in a first direction and a second generally horizontally extending portion moving in said first direction; first roll means having a circumferential portion engaged with said endless belt means at said first generally horizontally extending portion thereof for forming a first nip for initially engaging said carton blank at said first end thereof with said second face surface facing said endless belt means second roll means having a circumferential portion engaged with said endless belt means at said second generally horizontally extending portion thereof for forming a second nip for initially engaging said carton blank at said second end thereof with said first face surface facing said endless belt means; means for urging said second end portion of said carton blank means into said second nip after said carton blank becomes disengaged from said first nip; whereby said carton blank is flipped endwise and facewise during conveyance through said first and second nip.

The invention may also comprise a method of processing a carton blank of the type having a first face surface, a second face surface opposite said first face surface, a first end portion terminating in a first edge surface, and a second end portion opposite said first end portion and terminating in a second edge surface comprising the steps of: conveying said carton blank through a first nip assembly first end portion first and first face surface up; as the second end of said carton blank emerges from the first nip assembly, urging it into a second nip assembly; and conveying the carton blank through the second nip assembly second end portion first and second face surface up.

BRIEF DESCRIPTION OF THE DRAWING

An illustrative and presently preferred embodiment of the invention is shown in the accompanying drawings in which:

FIG. 16 is an elevation view of the flap folding apparatus of FIG. 7 viewed from an upstream position.

DETAILED DESCRIPTION OF THE INVENTION

Prior Art

Figure 1:
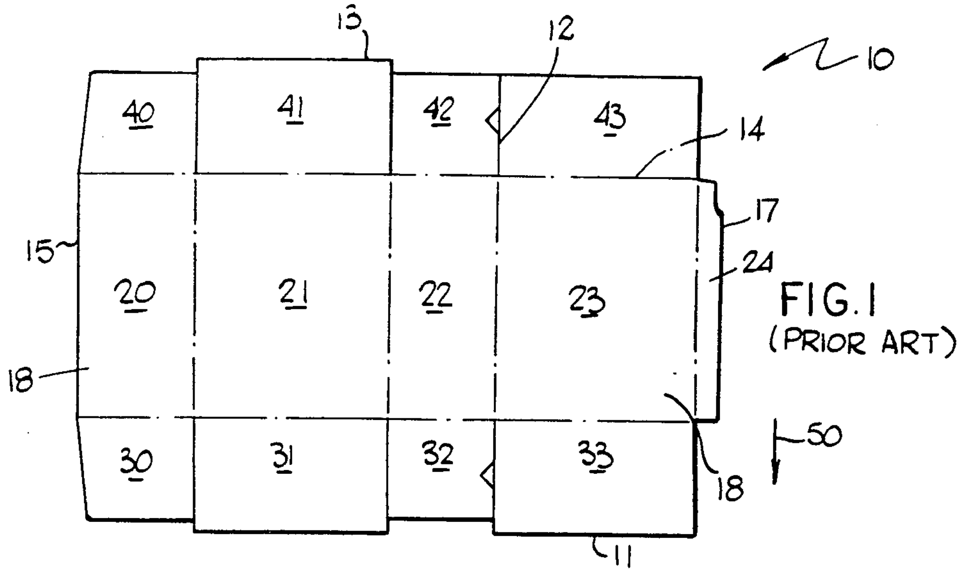
FIG. 1 (PRIOR ART)
FIG. 1 is a top plan view of a carton blank.

A prior art carton blank 10 is illustrated in FIG. 1. The carton blank has a leading edge 11, a trailing edge 13, and a pair of lateral side edges 15, 17, as defined with reference to a machine direction 50 in which the carton blank moves as it passes through a conventional folder/-gluer apparatus 106, FIG. 3. The carton blank 10 has a gridwork of score lines 12, 14, etc., provided on a flat top surface portion 18 thereof. The score lines separate the carton blank into a plurality of panels including sidewall panels 20–23, sidewall glue tab panel 24, leading edge endwall panels 30–33, and trailing edge panels 40–43. The blank 10 has a flat bottom surface portion 19 parallel to the top surface 18, FIG. 3, and may be formed from 0.010 to 0.050 inch thick paperboard.

Figure 2:
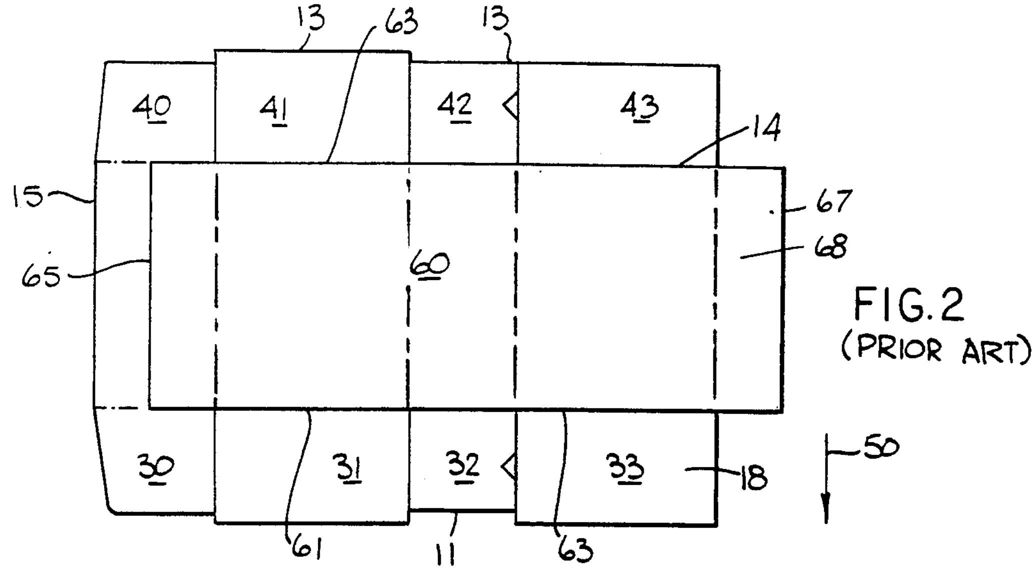
FIG. 2 (PRIOR ART)
FIG. 2 is a top plan view of a carton blank with an insert panel attached thereto.

The carton blank 10 is of a type which is adapted to be attached to a reinforcing insert panel 60, FIG. 2, prior to being folded in a conventional folder/gluer machine 106. The insert panel comprises a leading edge 61, a trailing edge 63, a first lateral side edge 65, a second lateral side edge 67, a top surface portion 68, and a bottom surface portion 69, FIG. 3. The insert panel may also have score lines dividing the blank into separate panels (see FIG. 2). These score lines are adapted to be aligned with score lines of a carton blank on which the insert panel is positioned. The bottom surface portion of the insert panel is attached to the top surface portion of the carton blank by adhesive. The insert panel may be constructed from single sheet paperboard or may be formed from corrugated paperboard, etc.

Figure 3:
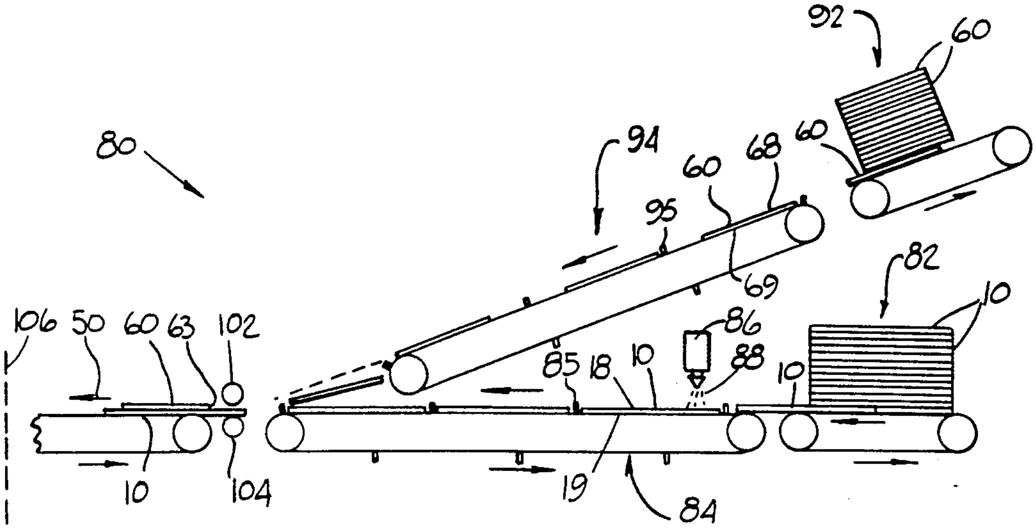
FIG. 3 (PRIOR ART)
FIG. 3 is a schematic elevation view of a prior art apparatus for attaching insert panels to carton blanks.

A prior art device 80 for attaching a plurality of insert panels 60 to a plurality of carton blanks 10 in a continuous machine operation is illustrated in FIG. 3. The device comprises a carton blank sheet feeder 82 which feeds blanks one at a time to a carton blank conveyor 84 which is provided with a plurality of timing lugs 85 which engage the trailing edge 13 of each carton blank and move the carton blanks along a preset path. An adhesive applicator 86 is provided at a station along the path and applies a molted strip of fast drying adhesive 88 to each blank. An insert panel sheet feeder 92 is positioned above the carton blank conveyor and feeds insert panels 60 one at a time into an insert panel conveyor 94 with panel engaging lugs 95. The insert panel conveyor moves the insert panels along a path which converges with the carton blank conveyor path. The insert panel conveyor and the carton blank conveyor are precisely speed matched and synchronized with one another such that each insert panel is deposited with its trailing edge 63 in registry with score line 14 of a carton blank 10.

THE INVENTION

Figure 4:
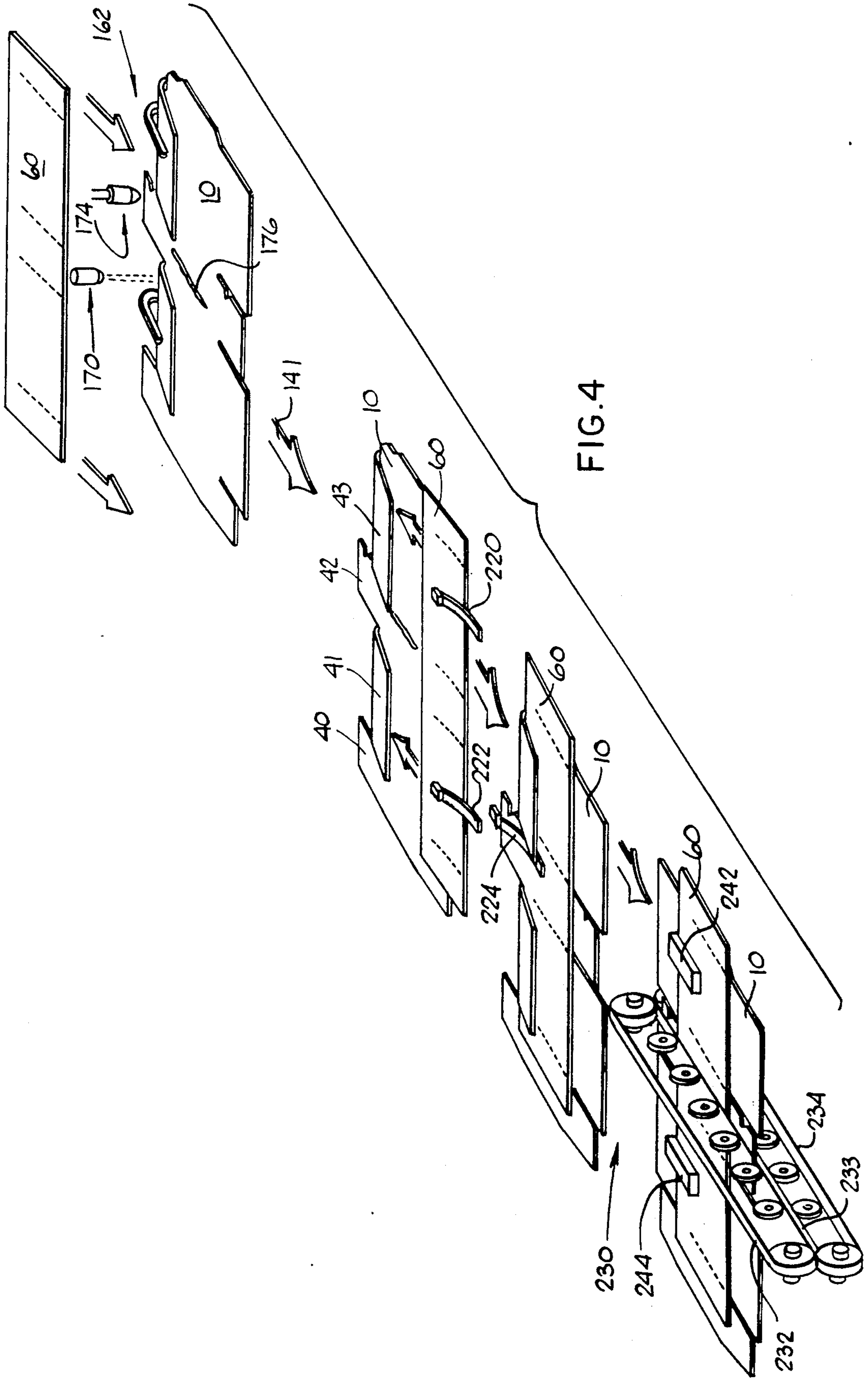
FIG. 4 is a schematic perspective view of an apparatus for attaching insert panels to carton blanks.
Figure 5:
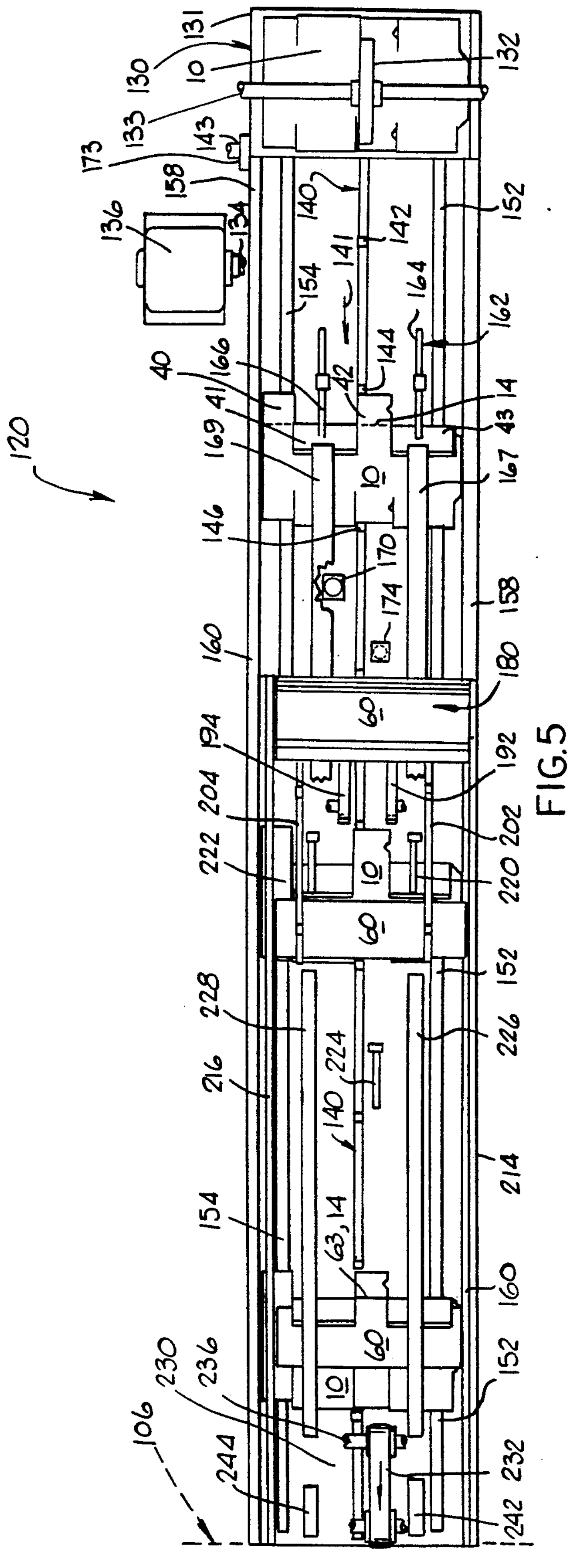
FIG. 5 is a top plan view of an apparatus for attaching insert panels to carton blanks.
Figure 6:
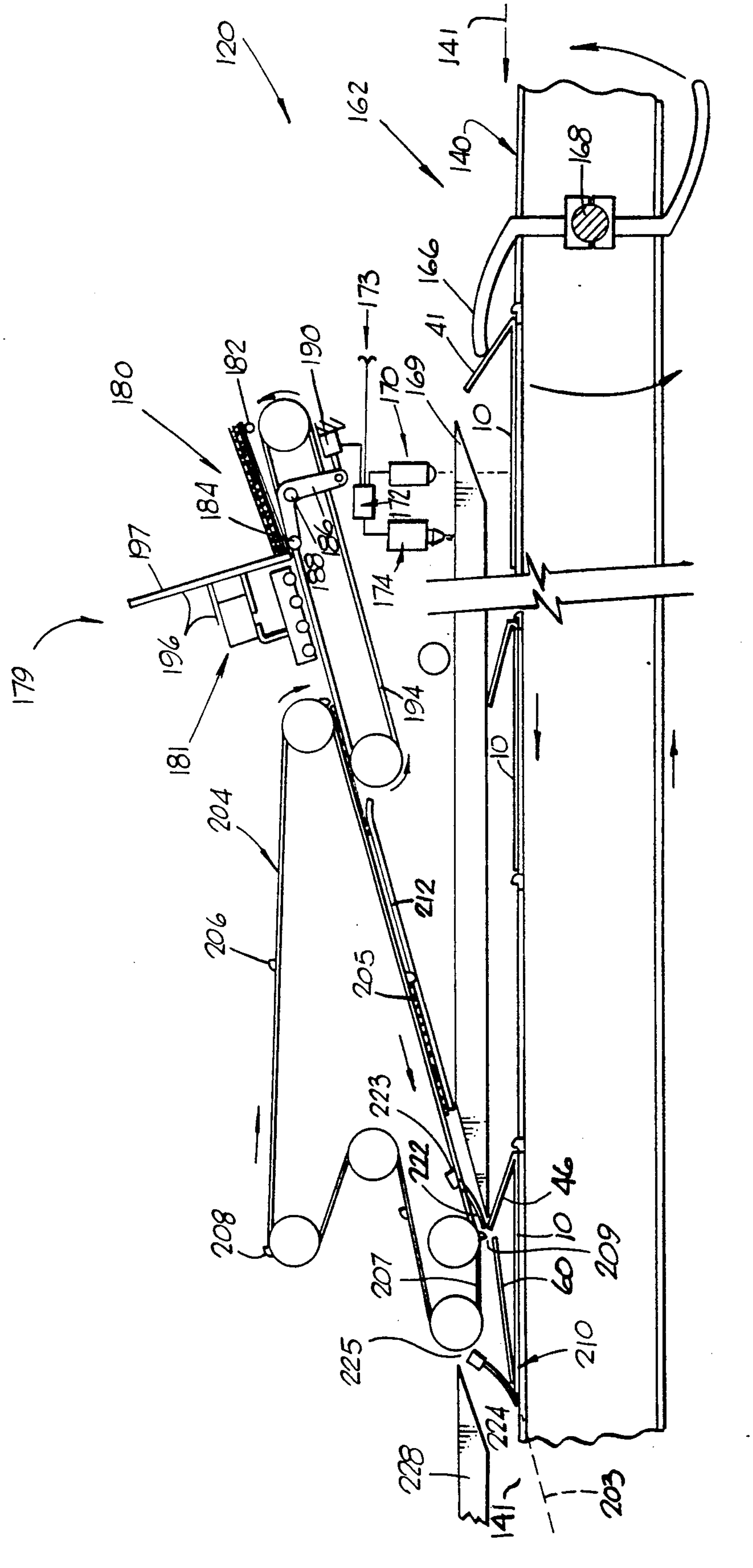
FIG. 6 is a detail, broken side elevation view of an apparatus for attaching insert panels to carton blanks.

FIGS. 4, 5 and 6 illustrate an apparatus 120 for attaching insert panels 60 to carton blanks 10 which, in general, comprises a carton blank conveyor 140 for moving carton blanks 10 along a predetermined displacement path 141; a carton blank folder assembly 162 positioned at a fixed station along the displacement path 141 for folding end panel portions, e.g. 41, 43, of each passing carton blank for providing an abutment surface e.g. 46, FIG. 6, for engaging an insert panel 60; an insert panel applicator 192, 194, 202, 204, etc., positioned at a fixed station along the displacement path 141 for applying an insert panel to each passing carton blank; and a registration assembly 220, 222, 224, for urging a predetermined edge portion 61 of each insert panel into abutment with the abutment surface 46 on each folded carton blank next adjacent to score line 14.

Having thus described an apparatus of the present invention in general, apparatus 120 will now be described more specifically.

Apparatus 120 includes a one at a time carton feeder assembly 130, FIG. 5, which may be of a conventional type comprising a conventional biasing holder 131 which holds a stack of carton blanks 10 therein and urges a top carton blank in the stack against a rotating feeder wheel 132. Rotating feeder wheel 132 is of a conventional construction well-known in the art comprising a small circumferential region which frictionally engages and removes the top carton blank from the stack during each rotation of the wheel and which thus feeds the carton blanks one at a time to a carton blank conveyor belt 140. The feeder wheel 132 is rotated by a shaft 133 which is mechanically linked to the drive shaft 134 of a drive motor 136.

A horizontally disposed carton blank conveyor belt 140 defines a carton blank displacement path 141 along which carton blanks 10 are moved during an insertion panel mounting and attachment process. The conveyor belt 140 may be an endless chain conveyor having a conveyor drive shaft 143 which is conventionally mechanically linked to drive motor shaft 134. The respective gear ratios of the linkage of shaft 133 and shaft 143 is such that the linear surface speed of conveyor belt 140 is faster than the linear surface speed of feeder wheel 132, e.g. twice as fast. The conveyor belt 140 is provided with a plurality of timing lugs 140, 142, 144, 146, etc., which are longitudinally spaced at intervals slightly longer than the distance between the leading edge and trailing edge of each carton blank 10, e.g. 0.5 inch longer. Adjacent lugs are adapted to, at different times, engage the leading edge 11 and the trailing edge 13 of a carton blank positioned therebetween. In one preferred embodiment of the invention in which the surface speed of the conveyor belt 140 is approximately twice the surface speed of feeder wheel 132, the belt 140 is synchronized with respect to the wheel such that a carton blank is fed to the conveyor belt between every other pair of lugs. (In FIG. 5, only three carton blanks 10 are shown on the conveyor 140 to avoid clutter.)

A pair of bottom support rails 152, 154 are disposed in the same plane as the upper surface of conveyor belt 140 and support the outer lateral portions of each carton blank 10 as it is moved along path 141.

A first and second lateral guide rail 158, 160 which extend parallel to path 141 engage the later edge portions 15, 17 of each blank 10 and maintain the edge portions in parallel alignment with path 141.

A folder assembly 162 is provided at an operating station downstream from the beginning of conveyor belt 140. The folder assembly comprises a first and second rotating folder member 164, 166 of a conventional construction well-known in the art. Folder members 164, 166 are mounted on a rotary shaft 168, FIG. 6, which is mechanically linked to drive motor shaft 134 by conventional linkage. The rotation rate of the members 164, 166 is such that the members engage the trailing edge panels 41, 43 of each passing carton blank and, due to the greater linear speed of members 164, 166, cause the end panels 41, 43, to be folded upwardly and forwardly about score line 14. The carton blank is prevented from slipping more than a short distance forward on the conveyor belt 140 during this process by the forwardly positioned conveyor lug, e.g. 146. The panels are folded forward substantially more than 90 degrees, e.g. 120 degrees, during their periods of engagement with members 164, 166. At approximately the same time that engagement with members 164, 166 terminates the folded end flaps 41, 43 are engaged by a first set of hold down rails 167, 169 which hold the associated end flaps in a relatively folded position in overlying relationship with the remainder of the carton blank 10, as best illustrated in FIG. 6.

A photo eye assembly 170 which is adapted to sense a leading edge portion 11 of each passing carton blank is positioned above the displacement path at a location downstream of the folder assembly 162. The photo eye assembly 170 may be a conventional LED/optical sensor pair of a type well-known in the art. The photo eye assembly generates a signal indicative of the passage of the leading edge of a carton which it provides to a control assembly 172. Control assembly 172 also receives a line speed signal as from a conventional encoder unit 173 attached to conveyor shaft 143. The control assembly 172 in turn actuates an adhesive applicator 174 and an insert panel feed assembly 181 in response to the photo eye signal at a time determined by line speed.

The adhesive applicator 174 which is actuated in response to the photo eye signal is positioned at a preset distance downstream from the photo eye which is determined based upon the maximum operating speed of the conveyor belt 140 and the response time of the applicator. In one preferred embodiment, the applicator is positioned so as to apply adhesive only to carton blank panel 22. The duration of the adhesive application is based upon the conveyor speed and may be controlled by control assembly 172. The adhesive 176 which is applied is preferably of a quick drying type such as are well-known in the art.

An insert panel applicator assembly 179 is provided in overlying relationship with the carton blank conveyor 140 as best illustrated in FIG. 6. The panel applicator assembly comprises an insert panel holder 180 which supports a stack of insert panels 60 by means of a fixed support shaft 182 and a displaceable forward roller unit 184 which also comprises a portion of a one at a time panel feeder assembly 181. The forward roller unit 184 is mounted at one end of a pivot member 186 which pivots about a fixed pivot shaft 188 and which is pivotally attached at its lower end to the shaft of a solenoid cylinder unit 190 which is actuated by a signal from controller 172. Thus whenever a carton blank is sensed by photo eye unit 170 the solenoid shaft is retracted causing roller unit 184 to be displaced downwardly. A pair of matched speed conveyor belts 192, 194 are provided in a common plane which is positioned at an elevation which is below the elevation of the roller unit 184 when the solenoid 190 is in an extended position but which is above the elevation of the roller unit 184 when the solenoid is in a retracted position. Thus when the roller unit is lowered by the solenoid the bottom most insert panel in the holder 180 is placed in contact with conveyors 192 and 194 which frictionally engage it and pull it from the bottom of the stack. The remainder of the insert panels 60 remain stationary due to the fact that they are engaged by a "doctor blade" assembly 196 having an upright member 197 which has a bottom edge surface which is positioned at a distance of one insert panel thickness above the plane of the conveyor belts 192, 194 and which thus allows the passage of only one insert panel at a time when roller assembly 184 is lowered. The duration of the solenoid retracted state is sufficiently short such that only one insert panel is withdrawn from the stack per actuation. Both conveyor belts are drivingly linked to drive motor drive shaft 134 and operate at a speed proportionate to the speed of carton blank conveyor 140.

The conveyor belts 192, 194 feed each insert panel onto insert panel conveyor chains 202, 204 having a plurality of timing lugs 206, 208, etc. thereon which are adapted to engage the trailing edge portion 63 of each insert panel 60. Conveyor chains 202, 204 operate at the same speed and have laterally oppositely positioned lugs. Conveyor chains 202, 204 are drivingly linked to drive shaft 13 by conventional mechanical linkage and thus operate at a speed proportionate to that of carton blank conveyor 140. A support rail 212 (only one shown), FIG. 6, is positioned adjacent to and below each conveyor chain 202, 204 and vertically support insert panels engaged by conveyor chains 202, 204.

The insert panel movement path 203 defined by insert panel conveyor chains 202, 204 intersects carton blank movement path 141 at 210. Conveyor chains 202, 204 are synchronized with conveyor chain 140 such that each end panel 60 is deposited at approximately the same longitudinal position on a below passing carton blank 10. The position at which each insert panel is deposited on a passing carton blank is sufficiently forward on the blank such that the trailing edge 63 of the panel 60 is positioned forward of the terminal edge of the each of the forwardly folded panels 41, 43 as illustrated in FIGS. 4 and 6.

As illustrated by FIG. 5, a pair of lateral guide rails 214, 216 are provided which guide the lateral edge portions 65, 67 of each insert panel from the infeed assembly 181 to the end of the apparatus 120 so as to maintain the end panel lateral edge portions in parallel relationship, initially, with path 203 and, later, with path 141.

An upstream set of drag fingers 220, 222 are provided near the end of the insert panel conveyor chains 202, 204. The drag fingers may be constructed from spring steel and may be mounted on a transversely extending member 223, FIG. 6, positioned above the insert panel displacement path 203. Drag fingers 220, 222 initially engage the leading edge portion of each insert panel 60 moving along path 203 urging it downwardly and into engagement with a below passing carton blank 10. Subsequent engagement of the drag fingers 220, 222 with the trailing edge portion of the insert panel facilitates its disengagement from the insert panel conveyor chain lugs.

A downstream drag finger 224 is supported on a transverse member positioned above the carton blank displacement path 141 at a position immediately downstream from the downstream end portion of the insert panel conveyor chains 202, 204. Drag finger 224 may also be constructed from spring steel. Drag finger 224 frictionally engages the upper surface of each insert panel which has been deposited on a passing carton blank at a lateral position thereon in alignment with unfolded carton blank end panel 42 This frictional surface engagement with drag finger 224 retards the forward movement of the insert panel along path 141 causing it to be displaced rearwardly relative to the underlying carton blank until its trailing edge portion 63 comes into engagement with the abutment surface 46 provided by each of the folded end panels 41, 43 at a position thereon immediately adjacent to and in parallel alignment with fold/score line 14.

As illustrated by FIG. 6, the insert panel conveyor chains 202, 204 have an inclined upstream portion 205 and a horizontally disposed downstream portion 207, both of which overlie and are parallel to the carton blank path 141. The horizontally disposed portion 207 of each of the conveyor chains 202, 204 is adapted to engage a terminal edge portion of each of the folded end panels of a passing carton blank to maintain the end panel in its folded position from a point 209 where the end panels leave engagement with the upstream set of hold down rails 167, 169 to a point 225 where the end panels are engaged by a downstream set of hold down rails 226, 228.

The downstream set of hold down rail 226, 228 are positioned in alignment with the upstream set of hold down rails 167, 169 and maintain the folded end panels 41, 43 in their folded position until the carton blank and associated insert panel have entered compression assembly 230.

As illustrated in FIGS. 4 and 5, the compression assembly comprises an upper idler compression belt 232 and a lower driven compression belt 234 which form a compression nip 233 therebetween and which are positioned in alignment with the sidewall panel 22 of each carton blank to which the adhesive material 176 has been applied. The upper and lower belts 232, 234 are both driven by a shaft 236 which is conventionally drivingly linked to drive shaft 134 of motor 136 and operate at a surface speed equal to or slightly faster than that of conveyor chain 140. In one preferred embodiment of the invention in which the fast drying adhesive 176 is product number HM4660 manufactured by H.B. Fuller having a business address of 200 Funston Road, Kansas City, Kan., the belts contact each carton blank and associated insert panel in a contact region 30 inches long and 1 inch wide. The belts operate at a maximum surface speed of 17 feet per second. The compression nip compresses the insert panel 60 and carton blank 10 and the adhesive 176 sandwiched therebetween to thereby firmly bond the insert panel 60 to the carton blank 10.

The downstream hold down rails 226, 228 terminate at a position approximately 30 inches downstream from the upstream end of the compression nip 233. Thus the folded end panels are retained in their folded position until after the associated carton blank and end panel have been engaged by the compression nip to ensured that the insert panel 60 is not moved from its registration position with the carton blank score line 14 prior to the compressive bonding which takes place at nip 233.

At a position approximately 3 to 5 inches downstream from the end of the downstream hold down rails 226, 228 and in alignment with rails 226 and 228 there are provided flip over members 242, 244 which each comprise a rounded and beveled upstream end which engage each of the folded end panels 41, 43 and fold the end panels backwardly into coplanar relationship with the remainder of the carton blank 10.

The compression belts 230, 232 may feed the carton blanks and attached insert panels directly into a conventional carton folder/gluer machine 106 or may feed the carton blanks and attached insert panels to a separate conveyor and/or collection tray (not shown) for separate collection and storage prior to processing by a carton folder/gluer machine.

ALTERNATIVE EMBODIMENT

An alternative embodiment of the invention which enables insertion of insert panels into carton blanks in an untimed mode of operation which permits relatively faster carton blank processing than the previously described embodiment is illustrated in FIGS. 7-18. The embodiment of FIGS. 7-18 is presently the best mode contemplated for practicing the invention.

Figure 11:
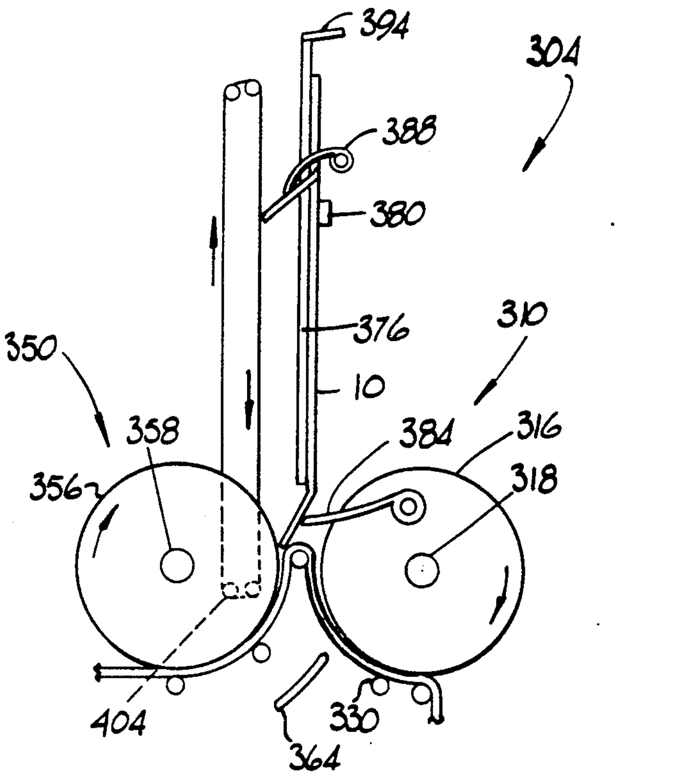
Figure 12:
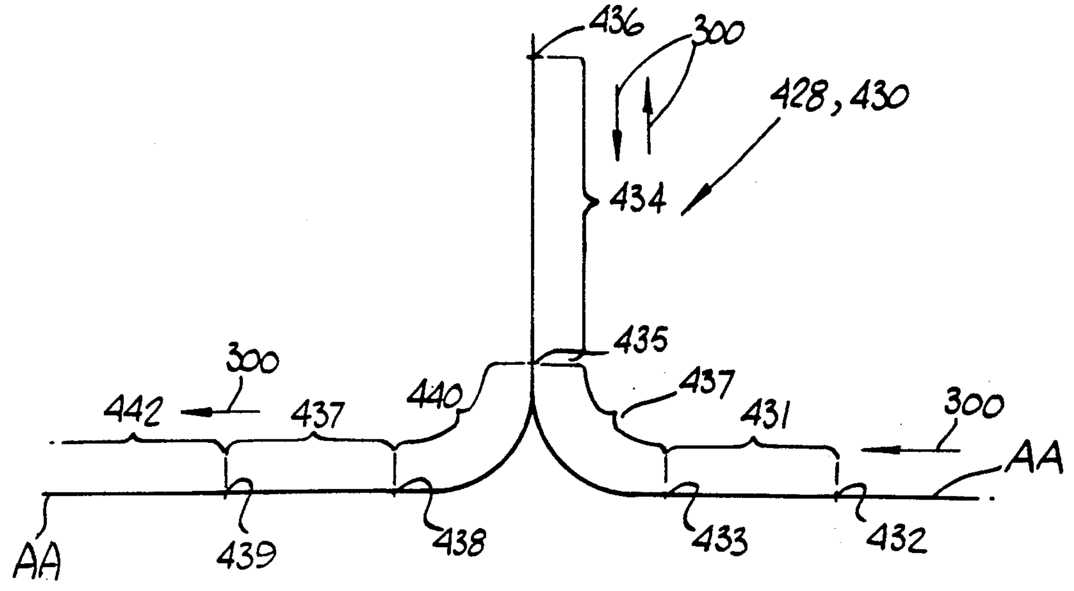
FIG. 12 is an illustration of the various portions of the path traversed by a carton passing through the flap folding apparatus of FIG. 7.
Figure 13:
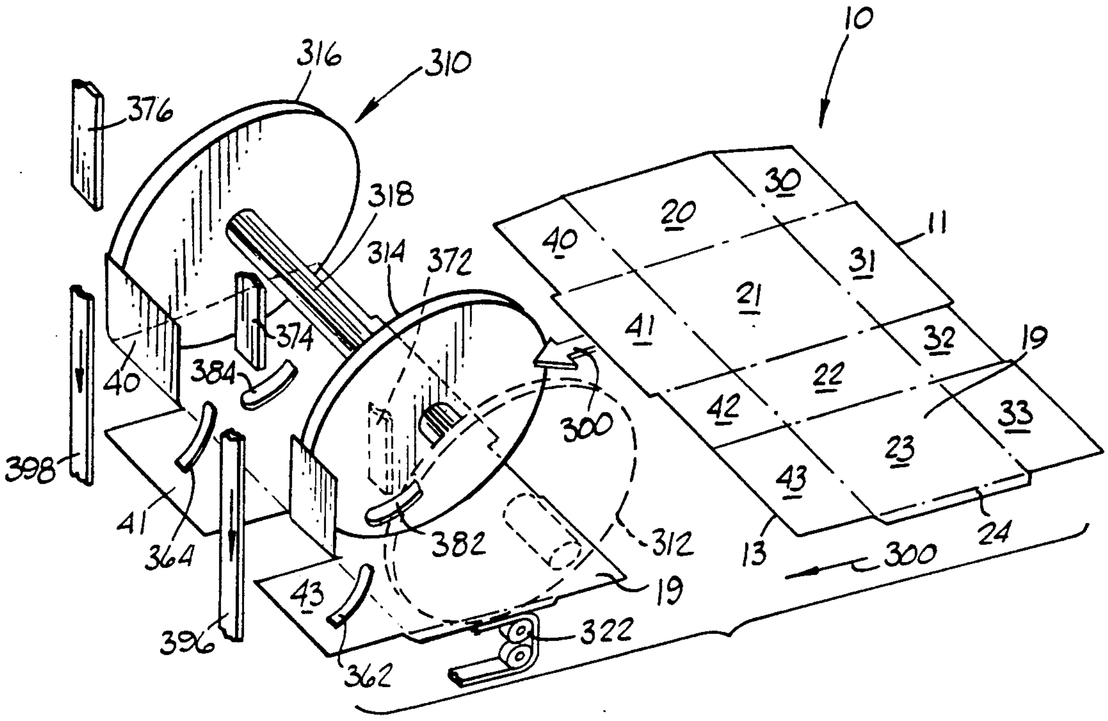
FIGS. 13–16 are broken away perspective views illustrating structure and various operations performed on carton blanks by the folding apparatus of FIG. 7.

FIGS. 7-18, in general, illustrate an apparatus 304, 450 for operating on a carton blank 10, FIGS. 1 and 13, of the type having a first face 19 surface, a second face surface 18 opposite the first face surface, a first end portion 40-43 terminating in a first edge surface 13, and a second end portion 30-33 opposite said first end portion and terminating in a second edge surface 11 and including at least one end flap 41, 43 at said first end portion thereof.

The apparatus 304, 450 for operating on a carton blank includes a carton inverting end flap folding apparatus 304 portion which comprises a flipping path 430, FIG. 12, for reorienting the carton blank 10 during displacement therealong. The flipping path includes a first path portion 431 having a first end 432 and a second end 433, a second path portion 434 extending generally transversely of the first path portion 431 and having a first end 435 and a second end 436, a first transition portion 437 connecting the second end 433 of the first path portion to the first end 435 of the second path portion 434, a third path portion 437 extending generally parallel to the first path portion 431 and having a first end 438 proximal the first path portion and a second end 439 distal the first path portion, and a second transition portion 440 connecting the first end 435 of the second path portion 434 to the first end 438 of the third path portion 437.

A first nip assembly 310, FIGS. 7-11, 13 and 14, is provided for initially nippingly engaging the carton blank 10 at the first end portion 40-43 thereof and for continuously nippingly moving the carton blank along the first path portion 431 in a direction from the first end 432 toward the second end 433 thereof with the first face surface 19 of the carton blank facing upwardly, and thereafter through the first transition portion 437 and along the second path portion 434 in a direction from the first end 435 toward the second end 436 thereof.

Figure 10:
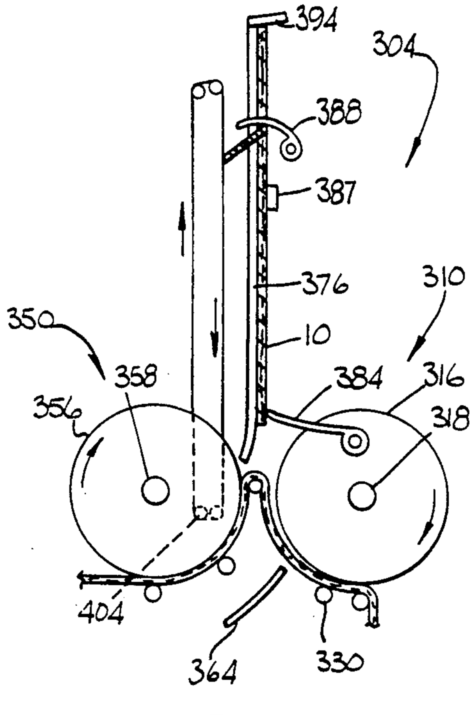

A second nip assembly 350 is positioned adjacent the first nip assembly for initially nippingly engaging the carton blank 10 at the second end portion 30-33 thereof after the carton blank is disengaged by the first nip assembly 310, FIGS. 10 and 11, and for continuously moving the carton blank along the second displacement path 434 in a direction from the second end 436 towards the first end 435 thereof and thereafter through the second transition portion and along the third path portion 437 in a direction from the first end 438 towards the second end 439 thereof with the first face surface 19 of the carton blank facing downwardly.

The apparatus 304 includes an untimed flap folding assembly 364 positioned along the flipping path 430 for engaging and folding the end flap 41 towards the second face surface 18 of the carton blank as the carton blank moves along the flipping path.

Figure 17:
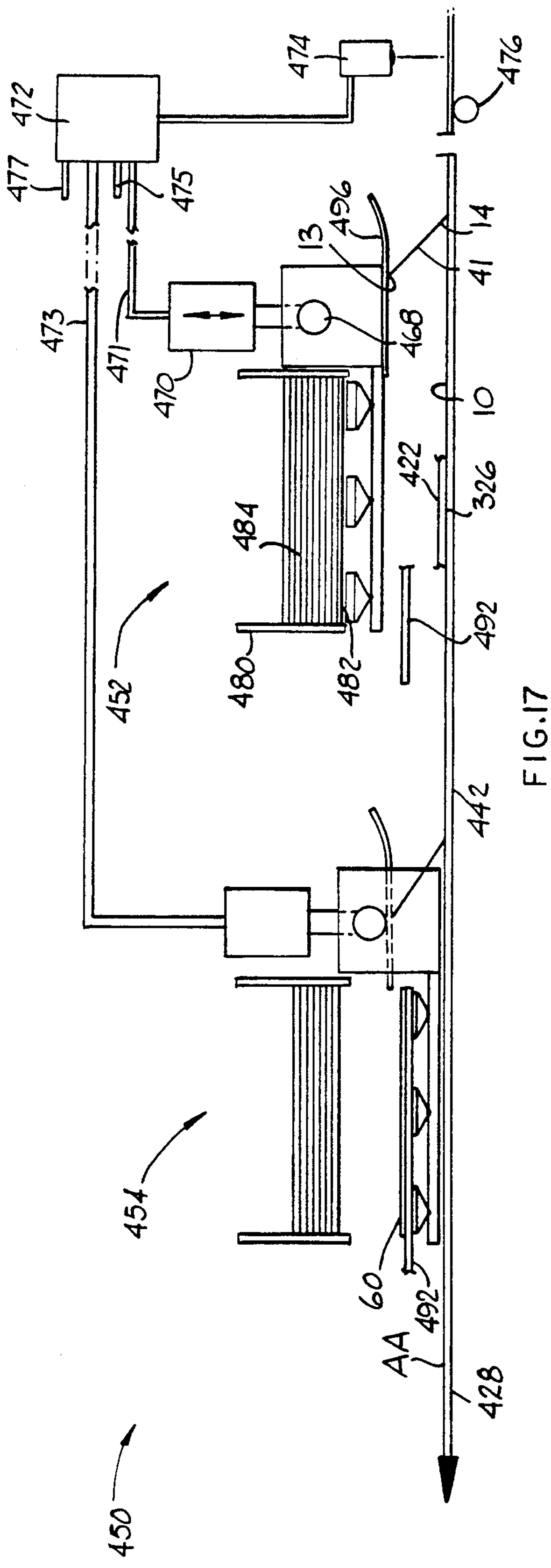
FIG. 17 is a side elevation view of a panel insertion apparatus.
Figure 18:
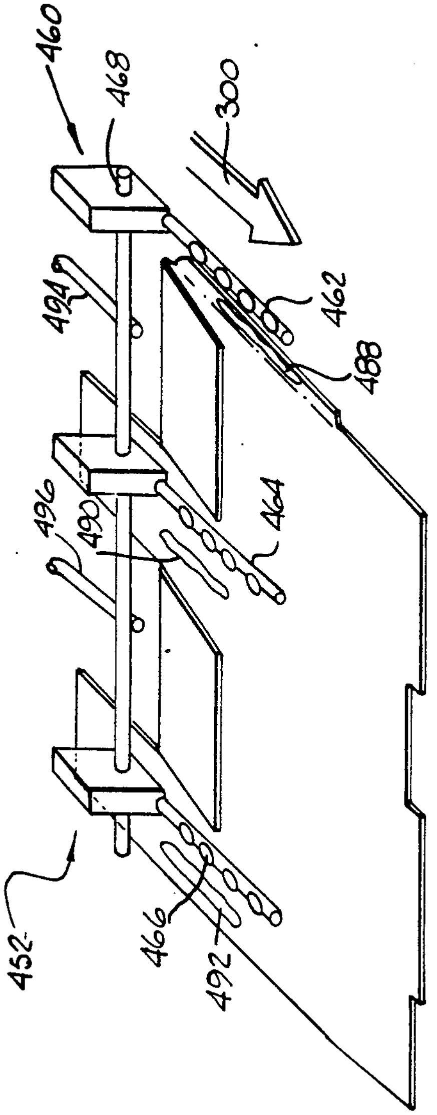
FIG. 18 is a top perspective view of a portion of the insertion apparatus of FIG. 17.

The carton processing apparatus 304, 450 also includes a panel insert apparatus 450 portion, FIGS. 17 and 18. Apparatus 450 includes a carton blank sensing assembly 474, etc., for sensing the relative position of a carton 10 along the path 430 and generating a carton blank position signal indicative thereof. An insert feed assembly 452 responsive to the carton blank position signal for positioning an insert panel 60 along the movement path 428 of the carton blanks in front of a sensed carton blank 10 at an elevation between that of a terminal edge portion 13 and a folding line portion 14 of a folded first end flap 41 of the carton blank whereby the insert panel 60 is scooped into the carton blank 10 by the folded first end flap 41 as the carton blank traverses its path of movement 428.

Having thus described the embodiment of the invention of FIGS. 7-18 in general, various features thereof will now be described in greater detail.

FIG. 13 illustrates a carton blank 10 identical to that shown in FIG. 1 but with side surface 19 thereof positioned upwardly. In view of the fact that in the embodiment of the invention of FIGS. 7-18 the carton blank reverses leading edges as it moves through the apparatus 304, the terminology used to refer to the carton blank 10 will be changed somewhat in this section. Edge 13 will be referred to as the first end terminal edge. End wall panels or flaps 40-43 will be referred to as the first end flaps. Fold line 14 will be referred to as the first end flap fold line. Terminal edge 11 will be referred to as the second end terminal edge. End wall flaps 30-33 will be referred to as the second end wall flaps. Face surface 19 which forms the major portion of the external surface of a carton formed from carton blank 10 will be referred to as the first face surface, and the face surface 18 which forms the major portion of an interior surface of a carton formed from carton blank 10 will be referred to as the second face surface. As further illustrated by FIGS. 12 and 13, the carton blank 10 moves through the apparatus 304, 450 in a machine direction indicated at 300 along a carton blank movement path 428 which includes a flipping path 428.

Figure 7:
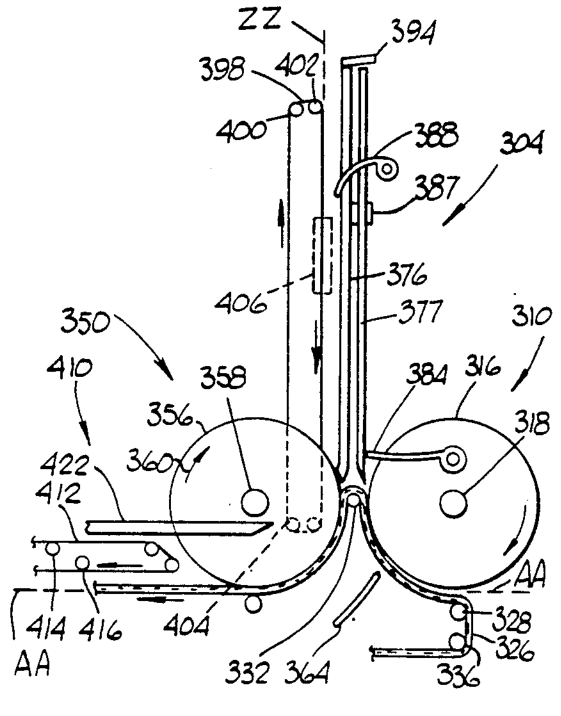
FIG. 7 is a side elevation view of an carton flap folding apparatus.
Figure 8:
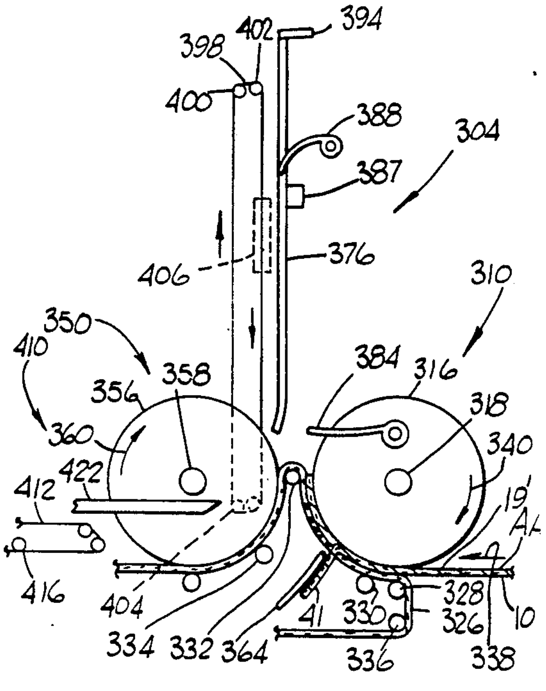
FIGS. 8–11 are side elevation views of the folding apparatus of FIG. 7 showing various stages of a flap folding operation.
Figure 16:
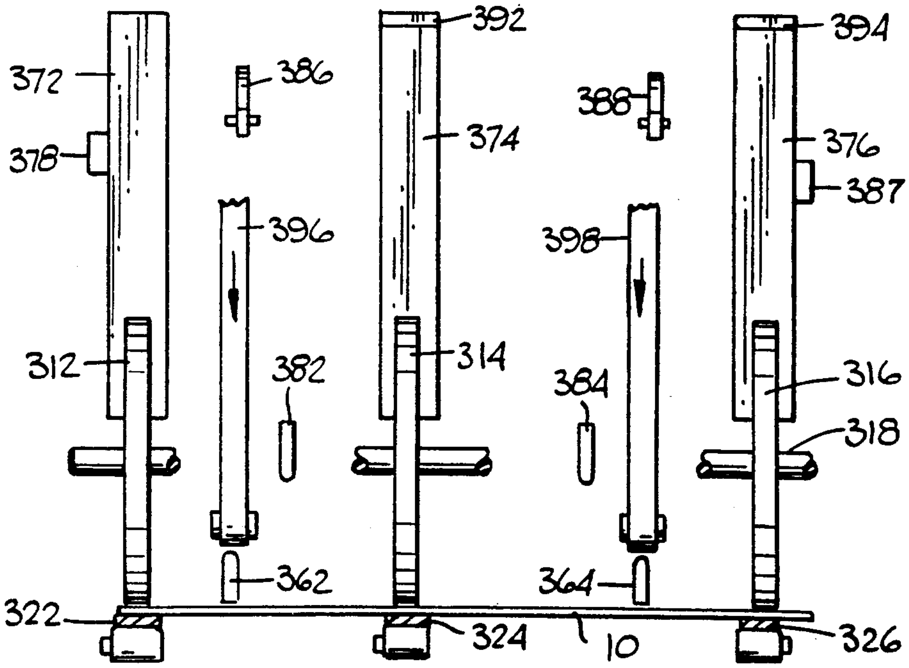

A carton blank enters the apparatus 304 at a first nip assembly 310 best illustrated by FIGS. 7, 13 and 16. The first nip assembly 310 comprises first, second and third pulleys or nip rolls 312, 314, 316 which freely rotate about a common axis as defined by shaft 318. The nip rolls are idler rolls which engage and are driven by first, second and third drive belts 322, 324, 326, respectively, which are in turn supported by idler rolls 328, 332, etc. Each of the drive belts is engaged and driven by a common drive shaft 336 which is in turn operably linked to a conventional drive motor (not shown). Reference numeral 338 indicates the drive belt direction, and reference numeral 340 indicates the nip roll direction. The nip rolls in one preferred embodiment each have a diameter of 10 inches and an axial length of 1.0 inches and are rotated by the associated drive belts at a surface speed on the order of 10 feet per second in an operation involving carton blanks having a length of, e.g., 8–25 inches in the machine direction 300. The first nip roll 312 is aligned with and engages carton panel 24, the second nip roll is aligned with an engages carton panels 42, 22, 32, and the third nip roll 316 is aligned with an engages carton panels 40, 20, 30 during operation as described in further detail hereinafter.

As best illustrated by FIGS. 7–11, 14 and 15, a second nip assembly 350 is provided downstream from the first nip assembly and comprises first, second and third nip rolls 352, 354, 356 aligned in the machine direction with the first, second and third nip rolls, respectively, of the first nip assembly. The first, second and third drive belts 322, 324, 326 extend upwardly around the nip rolls of the first nip assembly to a height of approximately one-half the diameter of the rolls and thereafter pass over idler rolls 332, 334, etc. positioned between associated upstream/downstream pairs of nip rolls, e.g. 316, 356, and thereafter are positioned in engagement with the rolls of the second nip assembly. Thus, the rolls of the first nip assembly and the rolls of the second nip assembly are all driven at the same rate of rotation. The first, second and third nip rolls of the second nip assembly freely rotate about a common axis defined by a shaft 358 positioned parallel to shaft 318 of the first nip assembly. Reference numeral 360 indicates the rotation direction of the nip rolls of the second nip assembly.

As illustrated by FIGS. 7, 13 and 16, stationary flap guide bars 362, 364 are positioned between rolls 312, 314 and 314, 316, respectively, in alignment with flaps 43, 41, respectively. The flap guide bars may comprise a lateral width of 1 inch and may comprise a radius of curvature equal to the radius of curvature of the nip rolls. The guide bars are adapted to engage and fold downwardly an associated flap 41, 43 of a passing carton blank, initially folding the flap downwardly and thereafter enabling the flap to ride up and over the upper end surface thereof as the carton blank moves upwardly within the first nip assembly. Each flap guide bar 362, 364 is positioned forwardly of the axis of rotation of the first nip assembly nip rolls at the point where it intersects the horizontal plane AA initially traversed by the carton as it enters the first nip assembly. The top of each flap guide bar may be positioned approximately 0.5–1 inch below plane AA and forwardly of the common axis of rotation of the first nip assembly rolls. The bottom end of each flap guide bar may be positioned below plane AA and forwardly of the common rotation axis.

Figure 14:
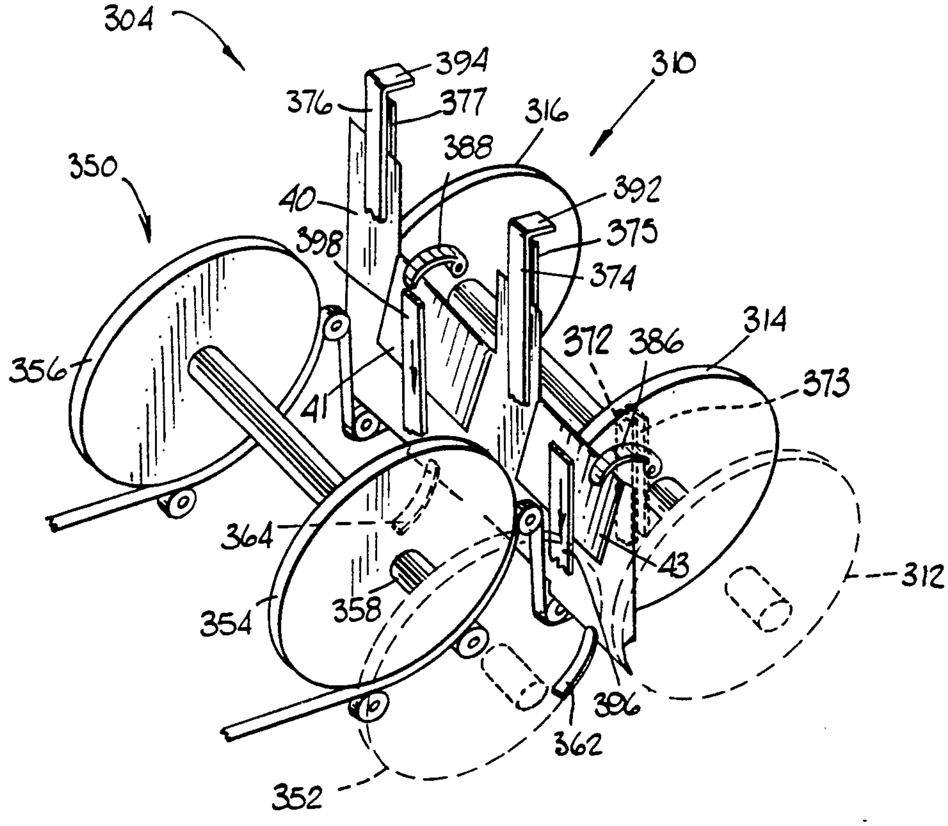
Figure 15:
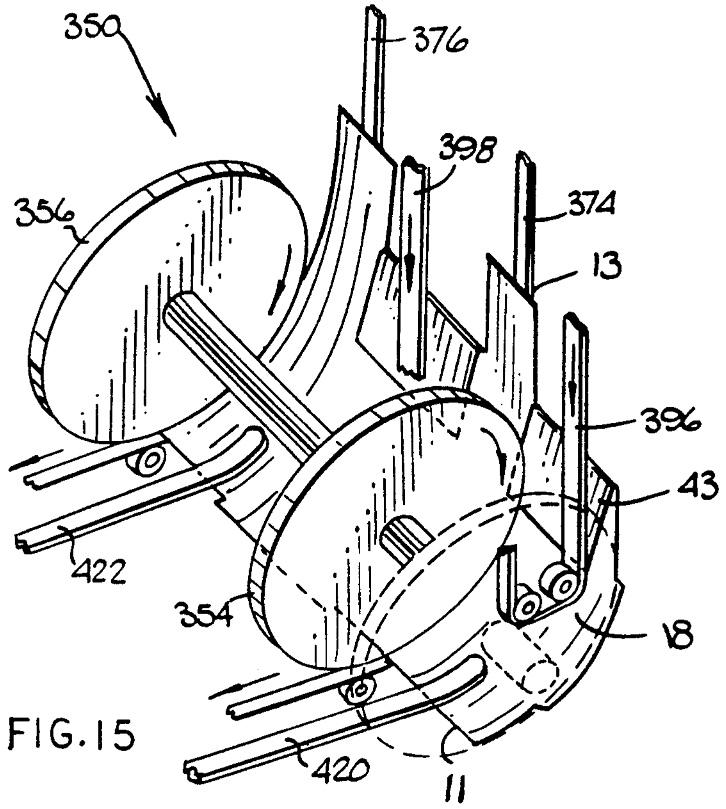

A pair of vertical guide rails 372, 373, 374, 375, 376, 377, FIGS. 7 and 14, is associated with each of the carton portions which are not folded during passage through the first nip assembly, i.e. vertical guide rails 372, 373 are positioned in alignment with panel 24; rails 374, 375 are positioned in alignment with panels 42, 22, 32; and rails 376, 377 are positioned in alignment with panels 40, 20 and 30. The vertical guide rails guide the carton blank along a vertical path as the carton blank is moved upwardly by the first nip assembly and thereafter moved downwardly by the second nip assembly. Lateral guide members 378, 387, etc., FIG. 16, may be mounted on the outside vertical guide rails 372, 376 to maintain the carton blank in proper lateral alignment as the carton blank moves up and down the vertical guide rails. Each pair of vertical guide rails may be centered between the associated nip assemblies, e.g. above idler 332, FIG. 7, and may have lower ends positioned 1 inch below the rotation axis of the nip rolls. Forward biasing members 382, 384 which may comprise conventional finger springs, as best illustrated by FIGS. 7, 13 and 16 are provided between the first nip rolls at an elevation near the bottom end of the vertical guide rails. As a carton blank moves through the first nip assembly, it is engaged by each of the forward biasing members 382, 384 which deflect upwardly from the position shown in FIGS. 7 and 8 to the position illustrated in FIG. 9 during upward movement of the carton blank. However, once the carton blank disengages from the first nip assembly, the forward biasing members urge the lower end portion of the carton blank forwardly and, to some extent, downwardly so as to move it into the second nip assembly as best illustrated by FIG. 11. When the forward biasing member is in an unstressed state, the forwardmost end thereof may be positioned below and forwardly of the lower end of an associated vertical guide rail. Each of the forward biasing members 382, 384 is fixedly mounted on a stationary support member (not shown) attached to a rear end portion of the biasing member.

As best illustrated by FIGS. 7, 14 and 16, downward biasing members 386, 388 may be positioned in alignment with selected portions of the carton blanks, e.g. in alignment with flaps 42, 43 and are urged upwardly by the carton blank as the carton blank is moved upwardly by the first nip assembly. Once the carton blank disengages from the first nip assembly, the downward biasing members, which like the forward biasing members may comprise conventional finger springs, urge the carton blank downwardly to facilitate its engagement with the second nip assembly. The downward biasing members may be mounted on fixed struts (not shown).

Stop members 392, 394, FIG. 14, may be positioned at the top of vertical guide rails 374, 376 and serve the function of positively engaging and stopping a carton blank from upward movement along the vertical guide rails after it has been disengaged from the first nip assembly.

As best illustrated by FIGS. 7–11 and 13–16, flap hold down belts 396, 398 mounted on idler rolls 400, 402, etc. are driven by a common shaft 404 which in one preferred embodiment is linked to shaft 336 which drives first, second and third drive belts 322, 324, 326. Thus, hold down belts 396, 398 operate at a speed proportional to that of the nip rolls which in one preferred embodiment is identical to or slightly faster, e.g. 5% faster, than the speed of the nip rolls. The flap hold down belts are positioned between adjacent pairs of rolls in alignment with flaps 41, 43, respectively, and come into engagement with those flaps after the flaps have been folded by the flap folding bars and begin their upward path of travel. In one exemplary embodiment, the flap hold down belts each have a lateral dimension of 1 inch and have a flap engaging vertical plane ZZ positioned rearwardly of the vertical guide rails 372, 374, 376. The exact position of the flap hold down belts 396, 298 is, of course, a function of the flap length. The guide belts' lower ends terminate 1–2 inches below the axis of rotation of the nip assemblies. Although use of flap hold down belts is the presently preferred method of maintaining the folded flaps in a folded position as a carton blank moves up and down the vertical guide rails, it would also be possible to replace belts 396, 398 with smooth, low-friction rails as indicated in phantom at 406 in FIG. 7.

As illustrated in FIG. 7, as a carton blank emerges from the second nip assembly, it enters a third nip assembly 410 comprising an idler belt 412 mounted on a plurality of idler rolls 414, 416, etc. which is engaged by one of the drive belts, which in one embodiment is the third drive belt 326. Drive belt 326 extends horizontally from its point of disengagement with the second nip assembly and on through an insert apparatus 450 as will be subsequently described. Flap hold down rails 420, 422 are position in alignment with the folded flaps and extend from the second nip assembly through the third nip assembly to the insert apparatus 450. The hold down rails may be positioned at a height of, e.g., 1-2 inches above the plane AA of carton blank travel and begin forwardly of the flap engaging vertical plane ZZ of belts 396, 398.

Figure 9:
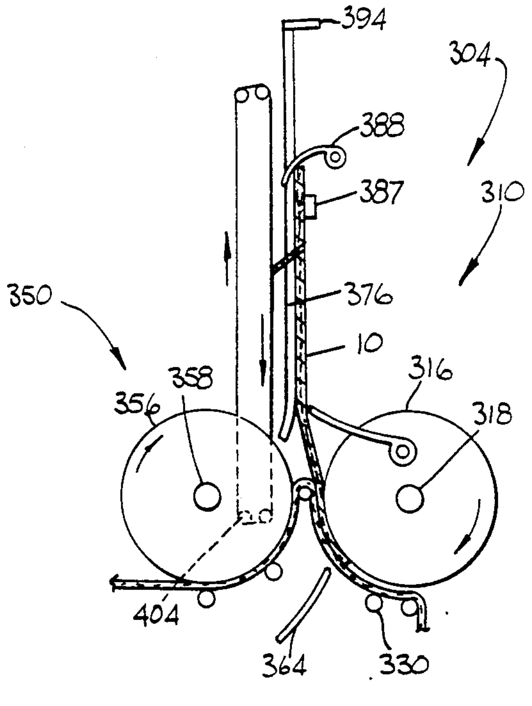

In operation, a carton blank 10 is fed into the first nip assembly by a one-at-a-time carton blank feed mechanism such as is previously described herein. The carton blank first end is initially engaged at panels 29, 42 and 40 by the first nip rolls 312, 314, 316 and is initially moved along a first horizontally extending path portion 431 (in a plane AA) having a first end 432 and a second end 433 as shown in FIG. 12. At a longitudinal position directly below the axis of rotation of the rolls of the first nip assembly the carton blank begins to enter an arcuate transition path portion 437. During movement through this transition path portion, the carton blank panels 41, 43 are engaged and folded downwardly by the flap guide bars 362, 364. As the carton blank moves upwardly, the first end portion thereof engages biasing members 382, 384 deflecting them upwardly as illustrated in FIG. 9 and the carton blank is guided upwardly by vertical guide rails 372, 374, 376 while flaps 41, 43 are simultaneously held in a folded position by hold down belts 396, 396. As the carton blank moves further up the guide rails, it encounters downward biasing members 386, 388 which it deflects upwardly until edge 13 encounters stops 392, 394, as illustrated by FIG. 10. At this point, the carton blank is disengaged from the first nip and it is only the carton's momentum that carries it into engagement with stops 392, 394. Thus, the carton blank has moved through the arcuate transition path 437 and up a vertical second path 434 having a first end 435 connected to the first transition portion 437 and a second end 436 at the uppermost end of carton travel as shown by FIG. 12. The carton next begins to move downwardly along the second path due to the force of gravity and the biasing force applied by springs 386, 388. Forward biasing springs 382, 384 urge the lower end of the carton blank forwardly such that the bottom edge 11 thereof enters the second nip assembly. The carton blank thereafter moves along a second transition portion 440 and into a third path portion 437 extending generally parallel to the first path portion 431 and preferably in the same plane AA thereof. The third path portion has a first end 438 located proximate the first path portion an connected to the second transition portion 440 and comprises a second end 439 distal the first path portion. During movement through the first path portion, face surface 19 of the carton blank was positioned upwardly. Due to the flipping movement associated with movement up and down the second path portion and into the second nip assembly, the carton blank is position with the face surface 19 downwardly and edge surface 11 forwardly as it traverses the third path portion 437. Thus, movement through flipping path 428 flips the carton endwise (11/13) and face surface-wise (18/19).

As illustrated by FIGS. 17 and 18, an insert apparatus 450 may be positioned downstream from the carton flipping and flap folding apparatus 304. The portion of carton path 428 extending through the insert apparatus may be in the same plane AA as the flipping path 430 first and third portions 431, 437 and in one preferred embodiment comprises a continuation of the third drive belt 326 and idler belt 422.

The insert apparatus 450 comprises a first insert station 452 and a second insert station 454. The two insert stations may be identical in construction and are positioned along a carton path defined by a first belt nip pair which may be a continuation of belts 326, 422. The first insert station comprises a suction cup assembly 460 which includes first, second and third longitudinally extending suction cup bars 462, 464, 466 which each have a plurality of longitudinally aligned suction cups thereon connected to a vacuum source (not shown). Bar 462 is aligned with panel 24; bar 464 is aligned with panels 42, 22 and 32; and bar 466 is aligned with panels 40, 20 and 30 of incoming carton blanks. Each of the bars 462, 464, 466 are part of a movable assembly which is positioned above the plane AA of the carton blanks. Each of the longitudinally extending suction cup bars 462, 464, 466 are attached to a common transverse member 468 which is upwardly and downwardly displaced by a pneumatic cylinder unit 470 in response to commands from a control unit 472.

The control unit receives input from an optical carton sensor 474 positioned along the carton path upstream of the insert stations 452, 454 and also receives an input signal from a conveyor speed indicator 476 which may be a conventional encoder unit. The control unit determines the relative position of carton blanks from these two signals in a manner well-known and conventional in the art. See, e.g. U.S. Pat. No. 4,496,417 dated Jan. 29, 1985 for CONTROL STRETCH LAMINATING DEVICE of Joseph R. Haake et al., which is hereby incorporated by reference for all that it discloses. The control unit 472 controls conventional control valves (not shown) through lines 471, 473, 475 and 477 to control vacuum to the suction cup bars and associated suction cups and to control the operation of the pneumatic piston.

The first insert station 452 comprises an insert panel stacking unit 480 having an open bottom portion 482 with a peripheral edge which supports a stack of insert panels 484 thereon and which enables removal of insert panels one at a time through suctional engagement with the suction cups of bars 462, 464, 466 when the bars are in an "up" position as shown by the position of station 1 in FIG. 17. Longitudinally extending insert panel support rails 488, 490, 492 positioned at a common elevation above the carton plane AA but below the upper edge of a folded flap are positioned in alignment with the unfolded flap portions of the incoming carton blanks. In the downwardmost position of the suction cup bars 462, 464, 466, which is the position shown for the second station 454 in FIG. 17, the suction cup bars are positioned slightly below the insert panel support rails 488, 490, 492 but above the carton plane AA.

In operation, the control unit 472 senses an incoming carton blank actuates either the first or second stations 452, 454 (the stations are actuated sequentially, each station responding to alternate incoming blanks) to position insert panels 60 on the insert panel support rails 488, 490, 492 in front of the incoming carton panel such that the carton panel folded flap scoops up the insert panel as it moves along the carton path 428. In operation, when a carton blank is sensed, the pneumatic piston of the selected station is already in the "up" position shown at the first station and the suction to the suction cup assembly is turned on. Thus, the suction cup assembly is mechanically attached to an insert panel at the bottom of stack 484. Next, with the suction still on, the pneumatic piston is moved downwardly to the position shown at the second station 454. At the lower end of the suction cup assembly movement, the vacuum is terminated and thus the engaged insert panel becomes disengaged from the suction cups at the point where it encounters the insert panel support rails 488, 490, 492. The insert panel thus rests on the rails 490, 492, 494 but is free to move longitudinally along the carton path 428 and is moved therealong by the folded flap portion 41, 43 of an incoming carton blank until the insert panel clears the forward end of the support rails, at which point it drops downwardly onto the carton blank. At this point in time, the suction cup assembly returns to its up position ready for actuation. Due to the forward velocity of the carton blank, the insert panel comes into abutting engagement with the carton blank at the fold line portion of flaps 41 and 43. Drag fingers (not shown) may also be used to help achieve this result. Thereafter, the carton blank and insert panel situated thereon are gluingly attached and subsequently folded in a manner previously described herein.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An apparatus for operating on a carton blank of the type having a first face surface, a second face surface opposite said first face surface, a first end portion having a plurality of foldable end flaps and terminating in a first edge surface, and a second end portion opposite said first end portion and terminating in a second edge surface comprising:

carton blank conveying means for moving carton blanks along a predetermined displacement path;

flipping path means for reorienting said carbon blank during displacement therealong comprising a first path portion having a first end and a second end, a second path portion extending generally transversely of said first path portion and having a first end and a second end, a first transition portion connecting said second end of said first path portion to said first end of said second path portion, a third path portion extending generally parallel to said first path portion and having a first end proximal said first path portion and a second end distal said first path portion, and a second transition portion connecting said first end of said second path portion to said first end of said third path portion;

first nip means for initially nippingly engaging at least one of said plurality of foldable end flaps of said first end portion and for continuously nippingly moving said carton blank along said first path portion in a direction from said first end toward said second end thereof with said first face surface of said carton blank facing upwardly and thereafter along said second path portion in a direction from said first end toward said second end thereof;

flap folding means positioned along said flipping path means for folding at least another of said plurality of foldable end flaps in a direction toward said second face surface;

second nip means positioned adjacent said first nip means for initially nippingly engaging said carton blank at said second end portion thereof after said carton blank is disengaged by said first nip means and for continuously moving said carton blank along said second displacement path in a direction from said second end towards said first end thereof and thereafter along said third path portion in a direction from said first end towards said second end thereof with said first face surface of said carton blank facing downwardly.

2. The invention of claim 1 wherein:

said at least one of said plurality of foldable end flaps comprises a first spaced apart plurality of foldable end flaps; and said at least another of said plurality of foldable end flaps comprises a second spaced apart plurality of said plurality of foldable end flaps.

3. The invention of claim 1 wherein said flap folding means comprises a passive folding means.

4. The invention of claim 1 wherein said flap folding means comprises stationary member means positioned proximate said first transition path portion for engaging said at least one of said plurality of foldable end flaps of said first end portion as it moves thereby.

5. The invention of claim 1 further comprising flap hold down means positioned along said second and third path portions for maintaining said folded end flap in a folded orientation.

6. The invention of claim 1 further comprising stop means positioned proximate said second end of said second path portion for positively engaging said first end portion of said carton blank for stopping displacement thereof from said first end toward said second end of said second path portion after said carton blank is disengaged by said first nip means.

7. The invention of claim 1 further comprising biasing means for urging said second end portion of said carton blank towards said second nip means after it is disengaged from said first nip means.

8. The invention of claim 7 wherein said biasing means comprises a first spring means for urging said second end portion of said carton blank in a direction generally transverse to said carton face surfaces.

9. The invention of claim 8 wherein said biasing means comprises a second spring means for urging said second end portion of said carton blank in a direction generally parallel to said carton face surfaces.

10. The invention of claim 1 further comprising:

carton blank sensing means for sensing the relative position of said carton means along its path of movement and generating a carton blank position signal indicative thereof;

insert feed means responsive to said carton blank position signal for positioning an insert panel along said carton blank path of movement in front of a sensed carton blank at an elevation between that of a terminal edge portion and a folding line portion of said folded end flap whereby said insert panel is scooped into said carton blank by said folded end flap as said carton blank traverses said path of movement.

11. The invention of claim 10 wherein said insert feed means comprises:

stacking means for vertically stacking a plurality of insert panels above said third path portion;

insert rail means positioned below said stacking means for supporting an insert panel at said elevation between that of said terminal edge portion and said folding line portion of said folded end flap;

suction cup means displaceable between a raised position and a lowered position for engaging an insert panel at the bottom of said stack means and drawing it out of said stack means and depositing it on said insert rail means.

12. An apparatus for operating on a carton blank of the type having a first surface adapted to form an exterior portion of a subsequently formed carton, a second surface adapted to form an interior surface of a subsequently formed carton, a front edge, a back edge, and a pair of opposite lateral side edges, a first end portion having a plurality of foldable end flaps being foldable along fold lines extending generally parallel to said front edge, comprising:

infeed means for feeding said carton blank into a first nip means in a generally horizontally disposed orientation with said first surface facing upwardly and said front edge leading;

said first nip means nippingly engaging at least one of said plurality of end flaps for urging said carton blank along a path including a forwardly extending, horizontal, first path portion, a generally vertical second path portion and an arcuate transition portion connecting said first path portion with a lower end of said second path portion;

flap folding means positioned along said path for engaging and folding at least another of said plurality of foldable end flaps toward said second surface of said carton blank as said carton blank traverses said first and second path portions;

stop means for positively engaging said carton blank and stopping upward displacement thereof along said second path portion after said carton blank leaves said first nip means;

first biasing means for urging said rear edge portion of said carton blank means generally horizontally toward a second nip means after it is disengaged from said first nip;

second biasing means for urging said carton blank generally vertically downwardly toward said second nip means after it is disengaged from said first nip means;

said second nip means being nippingly engaging said carton blank for urging said carton blank downwardly along said second path portion and forwardly along a generally horizontal third path portion and along a transition path connecting said lower end of said second path portion with said third path portion, said second nip means moving said carton blank along said third path portion in an orientation with said front edge trailing and said second surface up; and flap holding means for engaging said folded end flap for maintaining it in a folded orientation as it moves along said path.

13. The invention of claim 12 further comprising:

carton blank sensing means for sensing the relative position of said carton means along said path and generating a carton blank position signal indicative thereof insert feed means responsive to said carton blank position signal for positioning an insert panel along said third path portion in front of a sensed carton blank at an elevation between that of a terminal edge portion and said fold line of said folded end flap whereby said insert panel is scooped into said carton blank by said folded end flap as said carton blank traverses said third path portion.

14. The invention of claim 13 wherein said insert feed means comprises:

stacking means for vertically stacking a plurality of insert panels above said third path portion of said carton blanks;

insert rail means positioned below said stacking means for supporting an insert panel at said elevation between that of said terminal edge portion and said fold line of said folded end flap;

suction cup means displaceable between a raised position and a lowered position for engaging an insert panel at the bottom of said stack means and drawing it out of said stack means and depositing it on said insert rail means.

15. An apparatus for operating on a carton blank of the type having a first face surface, a second face surface opposite said first face surface, a first end portion having a plurality of foldable end flaps and terminating in a first edge surface, and a second end portion opposite said first end portion and terminating in a second edge surface comprising:

endless belt means for forming portions of a first conveying nip and a second conveying nip and having a first generally horizontally extending portion moving in a first direction and a second generally horizontally extending portion moving in said first direction;

first roll means having a circumferential portion engaged with said endless belt means at said first generally horizontally extending portion thereof for forming a first nip for engaging at least one of said plurality of foldable end flaps of said first end portion with said second face surface facing said endless belt means;

flap folding means for folding at least another of said plurality of foldable end flaps;

second roll means having a circumferential portion engaged with said endless belt means at said second generally horizontally extending portion thereof for forming a second nip for initially engaging said carton blank at said second end thereof with said first face surface facing said endless belt means;

means for urging said second end portion of said carton blank into said second nip after said carton blank becomes disengaged from said first nip;

whereby said carton blank is flipped endwise and facewise during conveyance through said first and second nip.

16. The invention of claim 15 further comprising carton flap folding means for folding a first end flap of said carton blank during conveyance thereof through said first nip.

17. The invention of claim 16 further comprising flap hold down means for maintaining said flap in a folded orientation after it is folded.

* * * * *